US006950123B2

(12) United States Patent
Martins

(10) Patent No.: US 6,950,123 B2
(45) Date of Patent: Sep. 27, 2005

(54) METHOD FOR SIMULTANEOUS VISUAL TRACKING OF MULTIPLE BODIES IN A CLOSED STRUCTURED ENVIRONMENT

(75) Inventor: Fernando C. M. Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 626 days.

(21) Appl. No.: 10/104,823

(22) Filed: Mar. 22, 2002

(65) Prior Publication Data

US 2003/0179294 A1 Sep. 25, 2003

(51) Int. Cl.[7] .............................................. H04N 7/18
(52) U.S. Cl. ...................... 348/157; 348/155; 382/173
(58) Field of Search .............................. 348/157, 159, 348/135, 155, 143, 699; 362/173, 164, 103, 236

(56) References Cited

U.S. PATENT DOCUMENTS

| | | | | |
|---|---|---|---|---|
| 5,764,803 A | * | 6/1998 | Jacquin et al. | 382/236 |
| 5,969,755 A | * | 10/1999 | Courtney | 348/143 |
| 6,643,387 B1 | * | 11/2003 | Sethuraman et al. | 382/107 |
| 6,661,918 B1 | * | 12/2003 | Gordon et al. | 382/173 |

OTHER PUBLICATIONS

Choi, et al., "Where are the ball and players?: Soccer Game Analysis with Color–based Tracking and Image Mosaick," Paper, pp. 1–15, Dept. of EE, Pohang University of Science and Technology, Republic of Korea.

Intille, et al., "Closed–World Tracking," IEEE, 1995, pp. 672–678, USA.

Isard, et al., "A Mixed–State Condensation Tracker with Automatic Model–Switching," Paper, pp. 107–112, University of Oxford, England.

* cited by examiner

Primary Examiner—Gims Philippe
(74) Attorney, Agent, or Firm—Steve P. Skabrat

(57) ABSTRACT

Simultaneous tracking of multiple objects in a sequence of video frames captured by multiple cameras may be accomplished by extracting a foreground elements from a background in a frame, segmenting objects from the foreground surface, tracking objects within the frame, globally tracking positions of objects over time across multiple frames, fusing track data of objects obtained from multiple cameras to infer object positions, and resolving conflicts to estimate most likely object positions over time. Embodiments of the present invention improve substantially over existing trackers by including a technique for extraction of the region of interest that corresponds to a playing field, a technique for segmenting players from the field under varying illuminations, a template matching criteria that does not rely on specific shapes or color coherency of objects but on connected component properties, and techniques for reasoning about occlusions and consolidating tracking data from multiple cameras.

26 Claims, 16 Drawing Sheets

| PLAYER NUMBER | FIELD POSITION | TIME |
|---|---|---|
| 1 | (43, 120) | FRAME 1 |
| 2 | (5, 12) | FRAME 1 |
| 3 | (63, 10) | FRAME 1 |
| 4 | (49, 100) | FRAME 1 |
| 5 | (13, 79) | FRAME 1 |
| 6 | (40, 67) | FRAME 1 |
| 7 | (89, 20) | FRAME 1 |
| ⋮ | ⋮ | ⋮ |

Figure 2

METHOD FOR SIMULTANEOUS VISUAL TRACKING OF MULTIPLE BODIES IN A CLOSED STRUCTURED ENVIRONMENT

BACKGROUND

1. Field

The present invention relates generally to computer vision and, more specifically, to three dimensional (3D) scene analysis for automatically visually tracking multiple bodies in motion via multiple cameras.

2. Description

A closed world is described by a finite set of objects and by a internal state for each of the instantiated objects. When one captures video in a closed world, each pixel of every frame should be explained as belonging to one (or a combination) of the known objects in the world. In one example, of a soccer match, the closed world contains players, referees, field lines, goals, the ball, and grass. The internal state of the closed world over time (e.g., the positions of the players) however, is unknown and may be computed from the incoming visual data in a sequence of video frames. Robust visual processing routines for computing the internal state may be selected using prior knowledge about the domain and any information that has already been learned about the state of the world. Closed worlds allow us to add constraints to the problem of tracking objects and therefore increase the robustness and reduce the complexity of the tracking problem.

Video annotation is the task of generating descriptions of video sequences that can be used for indexing, retrieval, and summarization. Video annotation is different from general image understanding in that one is primarily interested in the detection of specific events, as opposed to understanding the unbound semantics of the scene. Many video annotation domains require documenting interactions between people and other non-rigid objects against non-static backgrounds and in unconstrained motion.

Methods to track moving objects in video sequences for purposes of video annotation are being developed. Some work is underway in developing tracking systems for closed worlds such as for professional sports events. In one known system, analysis of the movement of players in a soccer match is implemented by examining color histograms of player's uniforms. However, the results of such a system may be negatively affected by changing levels of illumination in a video sequence. Hence, novel methods of tracking moving objects in an image sequence for video annotation or other purposes are desired.

BRIEF DESCRIPTION OF THE DRAWINGS

The features and advantages of the present invention will become apparent from the following detailed description of the present invention in which:

FIG. 2 is a diagram illustrating sample output data from the processing system of FIG. 1 according to an embodiment of the present invention;

DETAILED DESCRIPTION

An embodiment of the present invention is a method of tracking multiple bodies in a structured environment by analyzing a sequence of video frames. Embodiments of the present invention improve substantially over existing trackers by including a technique for extraction of a region of interest (ROI) that corresponds to a portion of a playing field, a technique for segmenting players from the playing field under varying illuminations, a template matching criteria that does not rely on specific shapes or color coherency of objects but on connected component properties, and techniques for reasoning about occlusions and consolidating tracking data from multiple cameras. In some prior art tracking systems, the systems focus on analyzing the colors of objects in a scene. Since colors on a player's uniform may be dependent on the illumination at different positions on the field, this approach has proven to be problematic. In contrast, in embodiments of the present invention, the motion of objects in a scene over a period of time may be analyzed to assist in determining positions of the objects. The objects identified as a result of this motion analysis may be tracked over multiple video frames to produce tracks of object positions over time. These object positions may be used for video annotation purposes to gather statistics and game summaries of the events occurring in the video sequence.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
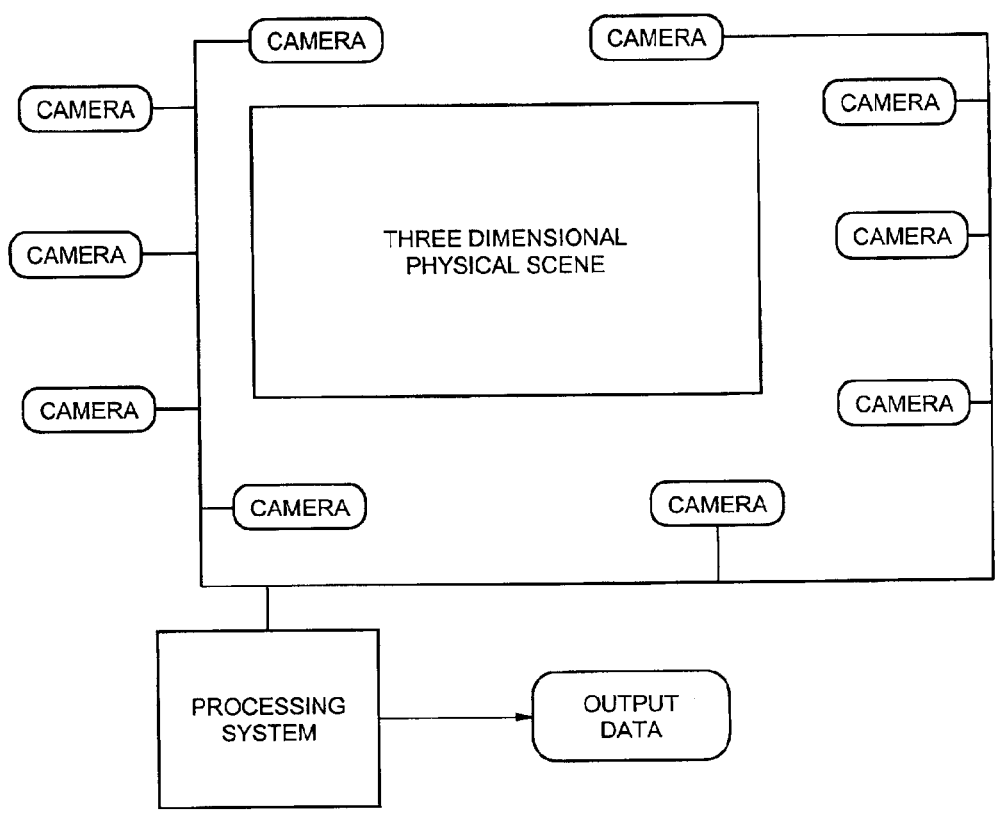
FIG. 1 is a diagram of a system for simultaneous visual tracking of multiple bodies according to an embodiment of the present invention.

In at least one embodiment, the present invention may be applied to the problem of tracking players and the ball in the video sequence of a soccer match. The soccer match may be captured by a plurality of cameras according to conventional techniques. FIG. 1 is a diagram illustrating a system for simultaneous visual tracking of multiple bodies according to one embodiment of the present invention. A plurality of cameras 10, 12, 14, 16, 18, 20, 22, 24, 26, and 28 may be used to capture images of a live, physical word three-dimensional (3D) scene 30 over time. Although in the present example, ten cameras are shown, in various implementations any number of cameras may be used. The cameras may be positioned anywhere around the 3D scene to capture what is happening in the scene. From a given viewpoint, a player may occlude another during game play. Placement of additional redundant cameras should be driven by the removal of ambiguity caused by these potential occlusions. The sequence of video frames captured by each camera may be communicated in either analog or digital form to processing system 32. If the video data arrives in analog form, the processing system may convert the data to digital form. In some instances, digital cameras may be employed to capture images and send digital video data to the processing system.

In one example, the 3D scene may be a live soccer match including a plurality of players, referees, and a ball moving around on a field of grass or other playing surface. The 3D scene may also include various background objects such as spectators, advertising signs, stadium structures, seats, the sky, and so on. During a game things in the closed world may change, such as the weather illumination, debris may be thrown by the crowd, players may get dirty, and grass damage may occur. In other instances, the present invention may be applied to visually tracking objects in other 3D scenes such as other sporting events (e.g., football games, tennis matches, etc.), security surveillance situations, automobile or air traffic surveillance, and other events occurring in environments capable of being described as a closed world.

In the soccer example, several problems must be addressed. The playing field should be extracted from every video frame in order to restrict the search area to a region of interest (ROI) when tracking players. Players and the ball should be identified and tracked in the video sequence. Players move nonrigidly, frequently collide with each other, and may be occluded by other players. The positions of the players over time should be determined.

Processing system 32 takes video data as input from the plurality of cameras, processes the video data, and produces output data 34. In one example, the video data may comprise sequences of video frames captured by the cameras over a period of time. The processing system applies techniques as described further herein to identify objects in each video frame and to generate tracks of object movement. A track is a sequence of geographic positions of an object over time in world coordinates. The processing system may comprise any system for processing data having a processor, a memory, and at least one input port or device, and at least one output port or device. For example, the processing system may be a personal computer (PC), a server, a mainframe computer, a minicomputer, or any other electronic device capable of operating on the video sequence and capable of executing a program to analyze the video data.

Output data may comprise time-stamped information about identified objects such as their identifiers, positions in the 3D scene (e.g., track data), and other data. For example, the data structure shown in FIG. 2 is a subset of what may be included in output data 34. When the processing system is used to analyze a soccer match, the output data may include items such as player number 36, field position 38 at a given time, and a frame or time designator 40. In various embodiments, many different types of information may be present in output data 34, depending on the implementation of the processing system and the contents of the 3D scene.

Figure 3:
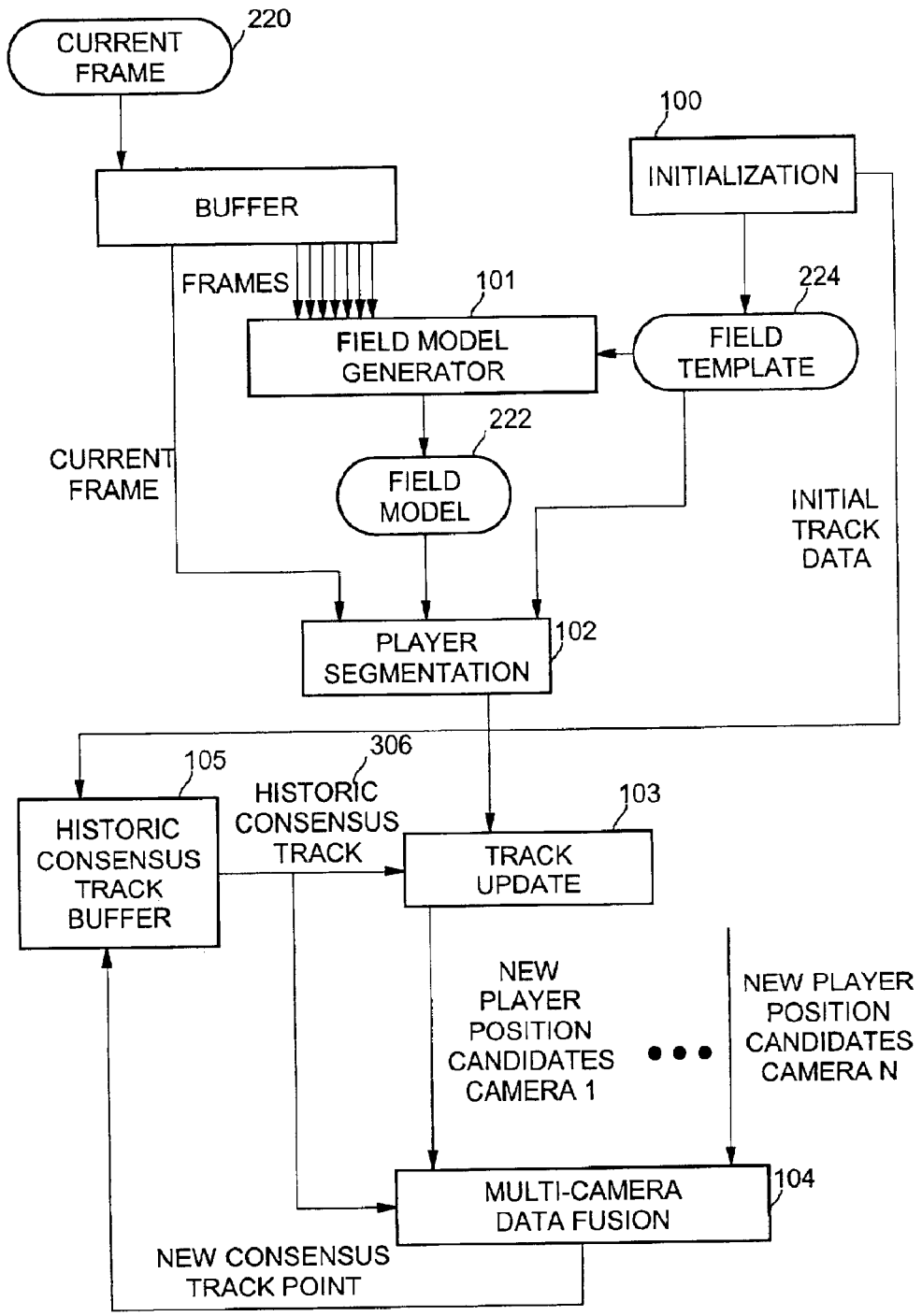
FIG. 3 is a high-level flow diagram illustrating components of a visual tracking solution according to an embodiment of the present invention.

In embodiments of the present invention, tracking is based on the movement of known objects in the closed world over time, not merely according to the matching of color of the objects. Multiple cameras are used and a late-binding approach is used to consolidate the tracking data inferred independently for each of the cameras. A high level flow diagram of the tracking techniques used by the processing system of the present invention is shown in FIG. 3. In the following paragraphs, the processing flow for data from a single camera will first be described, and then the consolidation process used to merge tracking data from multiple cameras will be described.

At block 100 of FIG. 3, the system first initializes processing of player tracking using an initialization component. In one embodiment, the present invention may be used for tracking players in a soccer match. In this example, creation of a soccer field template, calibration of all cameras and identification and initialization of layers is implemented in block 100. A field template is a binary template that designates which areas of the image are of interest. In the example of a soccer field, the field template is defined by the area enclosed by the sidelines.

Generally, in embodiments of the present invention, the cameras capture a sequence of video frames (2D projections of the 3D scene) that are input to the processing system. Since the cameras are calibrated a priori, the processing system may use the calibration parameters to back-project pixels from the 2D images back into 3D space. The 2D to 3D mapping for a given camera is known in computer vision as homography and is computed by well-known camera calibration procedures.

Figure 4:
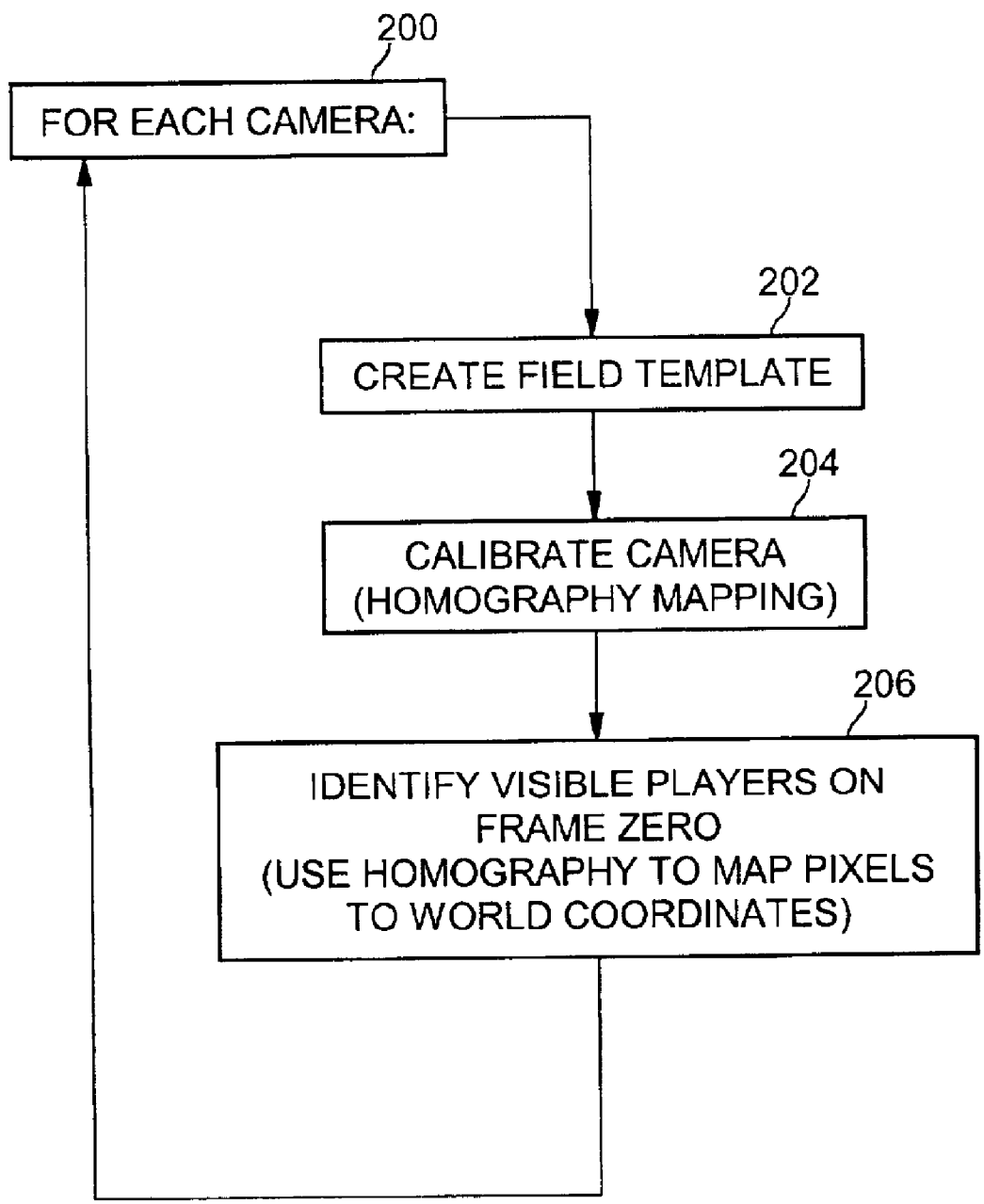
FIG. 4 is a flow diagram illustrating initialization processing according to an embodiment of the present invention.

FIG. 4 is a flow diagram illustrating the initialization processing of block 100 according to an embodiment of the present invention. At block 200, initialization processing may be performed by the initialization component for each camera in the system. At block 202, a field template for a camera may be created. At block 204, the camera may be calibrated using homography mapping. At block 206, the players visible on the first frame (i.e., frame zero) may be identified using homography to map pixels to world coordinates.

At the very beginning of the match, an identifier may be assigned to each player and object (such as the ball, for example) along with the player's or object's initial position on the field. All objects on the field are identified either manually or automatically. The initial position is also defined for each object on the playing field. In one embodiment, the initial position of each player on the field is given manually by clicking on the images of their bodies in a video frame of the field. This is possible because results of camera calibration are available at this point in the processing flow and allows one to use the homography mapping to translate image coordinates to world coordinates. The field may ultimately be represented as a two dimensional grid having X and Y coordinates in world coordinates.

Referring back to FIG. 3, at block 101 the processing system creates a field model by examining the motion of objects on the field (e.g., the players, the referees, and the ball) over a large but finite window of time. The field model is defined as an image where all moving objects are replaced by the stationary background underneath. This is accomplished by analysis of a long video sequence by a two-tier hierarchical median filter that constructs the field model efficiently. Alternative methods, including image mosaicing, may also be used. In different embodiments, the field model may be either computed once during initialization, updated sporadically, updated on a need-to-basis, or updated continuously. Adaptivity to lighting conditions and other dynamic events requires multiple updates.

Figure 5:
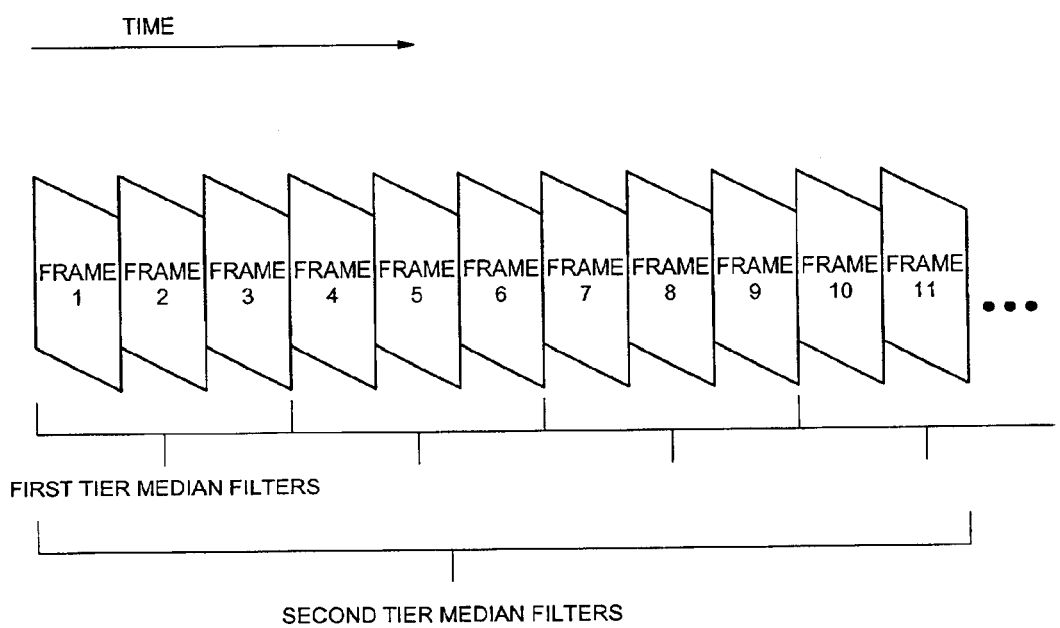
FIG. 5 is a diagram of a two-tier hierarchical median filter technique according to an embodiment of the present invention.

FIG. 5 is a diagram of a two-tier hierarchical median filter technique according to an embodiment of the present invention. This filter is designed to eliminate moving objects and to gracefully accommodate gradual environmental changes (such as illumination and sunset) and permanent environmental changes (such as debris thrown in the field, dirty uniforms, etc.). For every pixel of a video frame, the system seeks to remove the temporal color variability introduced by the moving objects and to preserve the constant background that becomes visible between field occlusion events. One approach is to median-filter each pixel over time. One problem with this approach is that the filtering windows must be wide to be useful and the computational cost becomes considerable.

An embodiment of the present invention creates an alternative lower cost solution by breaking the sequence of video frames into short consecutive sub-sequences. For explanatory purposes in FIG. 5, the number of frames in a sub-sequence is shown to be 3, although in one embodiment, the number of frames in a sub-sequence may be set to 20. In other embodiments, other numbers of frames may be used for each sub-sequence. For every pixel, the first tier median filtering process removes local temporal variations of color within each temporally adjacently sub-sequence. The set of most recently produced results of the first tier filter may then be kept and input to a second tier median filter to remove variations induced by slow moving objects—i.e., objects that remain stationary longer than the short window of time represented by the first tier filter, but not longer than half of the much larger temporal window covered by the second tier filter. The two-tier filter operates effectively on a temporal sliding window of the data that may comprise hundreds or thousands of video frames without incurring the computational cost of doing so. This technique allows for long-term motion analysis of video frames without imposing large memory or processing requirements. The two window widths and window overlaps are parameters that allow the system to control the amount of motion to filter out. In one embodiment, block 102 of FIG. 3 continuously produces a distinct field model for each camera in the system.

Figure 6:
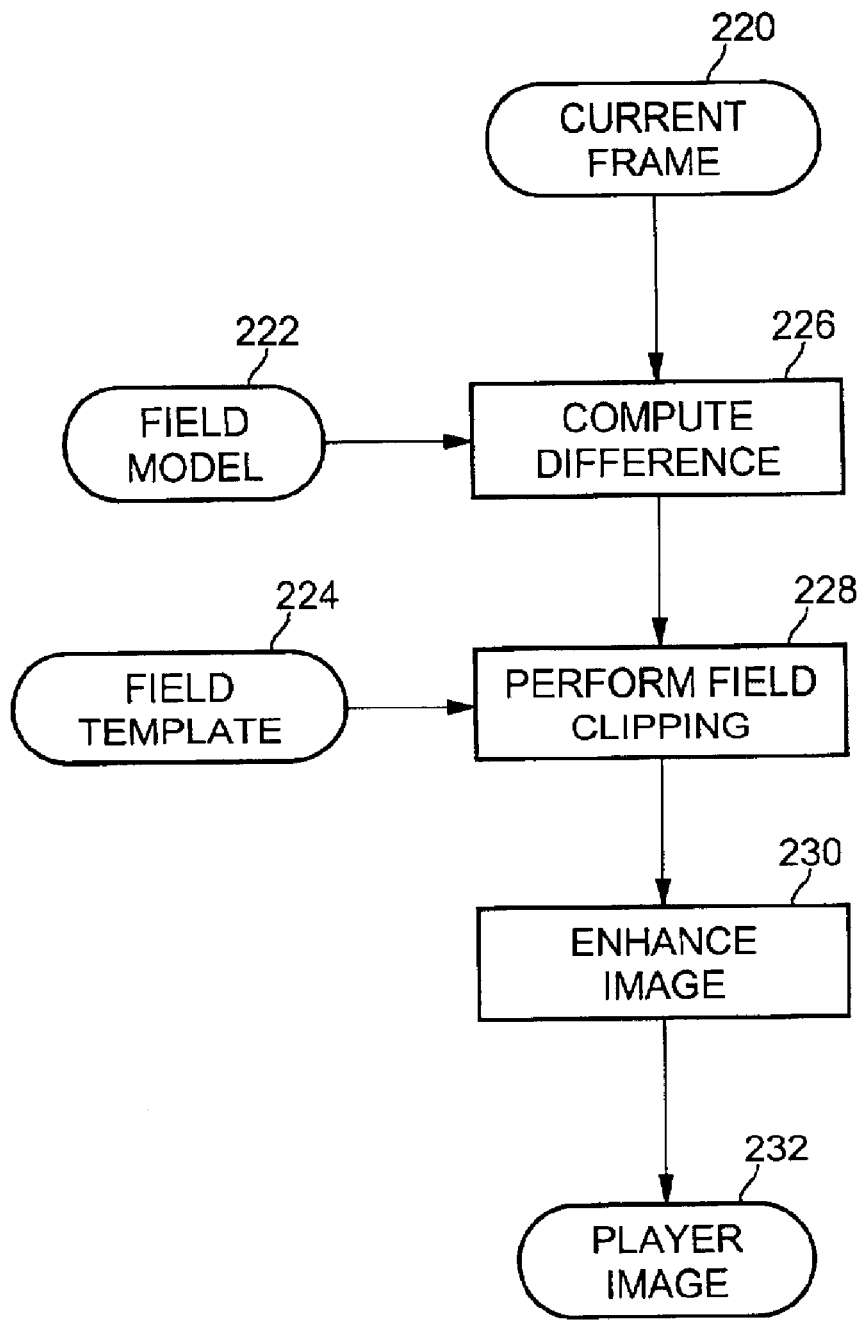
FIG. 6 is a flow diagram of a player segmentation component to produce an image with players segmented from the rest of the scene according to an embodiment of the present invention.

Referring back to FIG. 3, block 102 segments players from the playing field by examining the discrepancies between the field model (where players have been removed) and the current frame (where players are visible). FIG. 6 is a flow diagram of a player segmentation component for producing an image with players segmented from the rest of the scene according to an embodiment of the present invention. The player segmentation component takes the current video frame 220 of a video frame sequence from a camera, the field model 222 continuously generated by block 102 and the known binary field template 224 generated during initialization by block 100 and generates a player segmentation image where pixels belonging to a player are black and other irrelevant pixels are white. First the system computes the difference 226 between the current field model 222 (that only contains the grass background) and the current image 220 (grass plus players), leaving the players clearly identified as blobs. The field template 224 is applied to clip 228 the region of interest from the difference image. Finally, the clipped difference image is enhanced at block 230. In one embodiment, noise floor processing and morphological filtering may be applied to the clipped difference image. One goal of this step is to only consider connected components that are large enough to represent objects of interest. Enhancement of the clipped difference image produces one or more resulting images referred to herein as player images 232. This segmentation processing may be done for each video frame captured by each camera in the system.

The field model 222 is created by median filtering. Although perceptually equivalent, the field model is not a perfect match to the current background. Direct image differencing produces very poor results. A thresholded difference, where only differences larger than the threshold are considered, must be used to reduce the sensitivity to noise. In one embodiment, the camera noise floor may be measured a priori and used as a baseline threshold. The threshold can also be learned in an adaptive way by capturing videos of the field without moving objects and comparing them with the computed field models. In block 228 of FIG. 6, the player segmentation component extracts the region of interest in the difference frame by performing field clipping. One goal of this operation is to separate interesting regions of the field (including the players, the ball, and the playing surface (e.g., grass)) from other irrelevant background areas (such as spectators, surrounding stadium structures, and so on). Prior knowledge about positioning and calibration of each camera may be used to construct the segmentation templates. Segmentation may be obtained by masking the identified irrelevant pixels of the difference frame to the color black. This operation may eliminate irrelevant motion in the sidelines of the 3D scene that is not related to motion of the ball, the referee, and the players. Thus, any background movement including that of spectators may be eliminated from further consideration.

A field template 224 may be used to identify the irrelevant pixels as follows. The playing field is a known rectangle, but when seen by a camera at a given angle, it appears as a slanted quadrilateral given by an affine transformation. Since the positioning and intrinsic calibration of the camera are known, the affine transformation is also known and may be applied to the original rectangle to generate the desired quadrilateral region. A simple matrix-vector product is used to implement the affine transformation required to map each vertex of the rectangle into image coordinates. Alternatively, the four points of interest in the slanted quadrilateral may be manually selected directly by clicking on landmarks in the edges of the field. Often the camera field of view will not cover the whole playing field. In these cases, a more complex polygon may be required to describe the segmentation template, but the general principles described above still apply.

Figure 7:
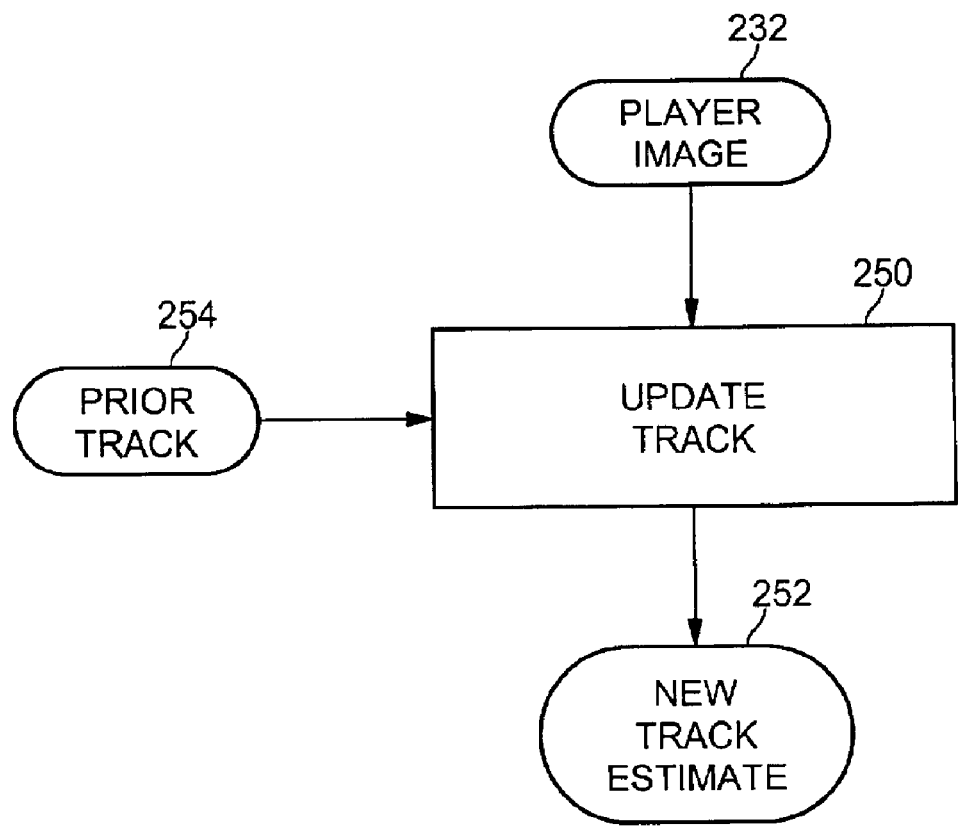
FIG. 7 is a diagram of a track update component to produce an updated track according to an embodiment of the present invention.

Referring back to FIG. 3, block 103 tracks players within a video frame by identifying the largest connected components inside each player's region of interest (ROI). FIG. 7 is a diagram of a track update component according to an embodiment of the present invention. Given the historic consensus track and a new player frame, block 250 of the processing system tracks objects (players, ball, referees, etc.) by performing connected components analysis inside each object's ROI. One goal of this tracking step is to compute the current estimate of an object's position (i.e., generate a new track estimate 252) by visual inspection of the enhanced difference frame (i.e., the player image 232) and prior track 254 information.

The object's ROI is a search region where that given object is expected to be currently found. In one embodiment, the object's ROI is defined as a bounding box around the last estimate of the object's position.

Figure 8:
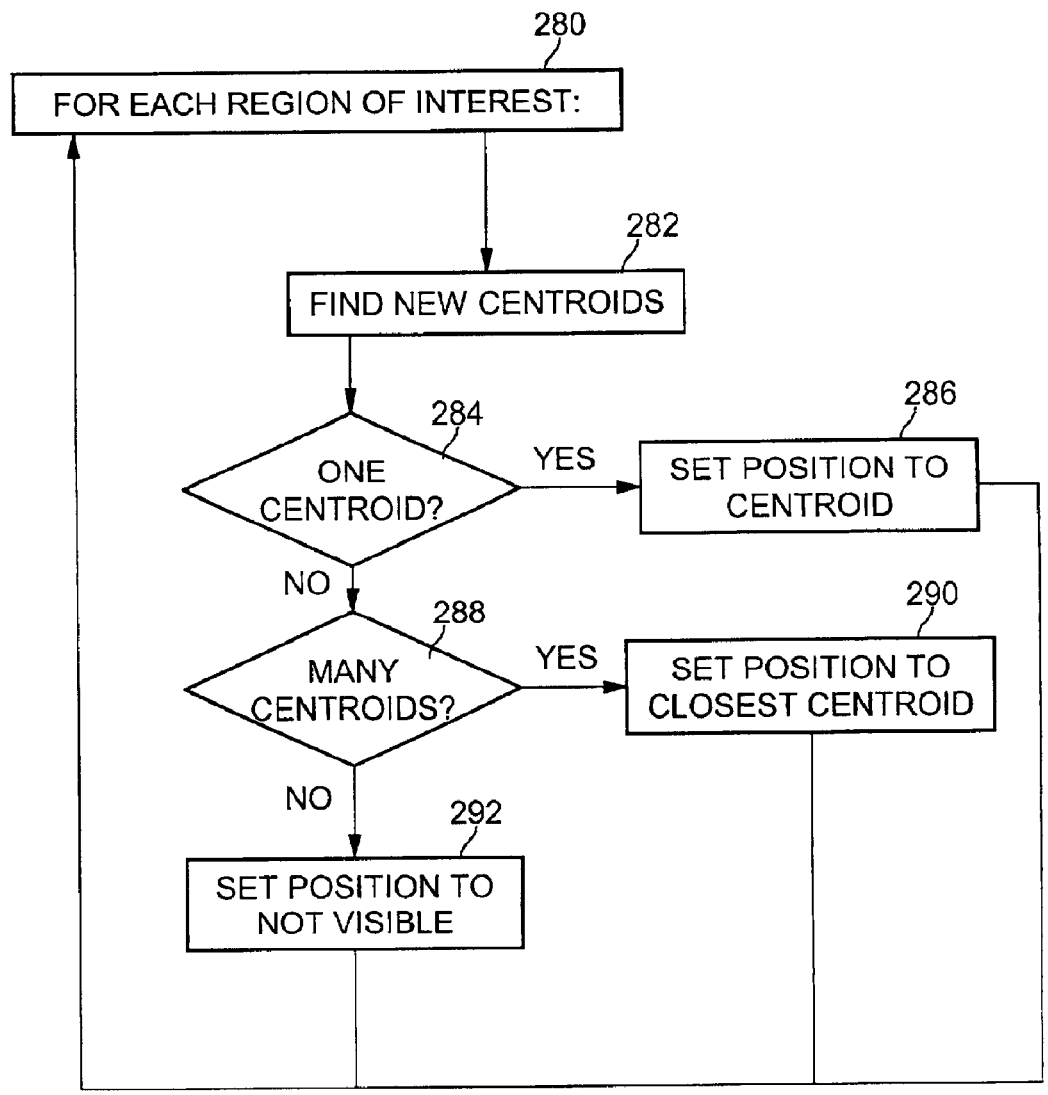
FIG. 8 is a flow diagram of the tracking update algorithm according to an embodiment of the present invention.

The tracking algorithm performing the estimation of the current position of the object is as shown in FIG. 8. At block 280, for each region of interest (ROI), the tracking technique finds new centroids within the ROI at block 282. If one centroid is found 284, then the position of the object may be set to the position of the centroid at block 286. If more than one centroid is found 288, then the position of the object may be set to the position of the closest centroid. If no centroids are found at block 282, then the position of the object may be set to not visible or unknown at block 292.

If there are no connected components inside the ROI, the camera for which the video frame is being processed cannot estimate the object track, and the track is marked invalid—other cameras should be better poised to resolve this tracking step. If there is only one connected component inside the ROI, the current position of the object is given by the centroid of that connected component. If there is more than one connected component in the ROI, the centroid of the connected component that better matches the prior object location is chosen (such as the closest). As frame-to-frame player motion is pixel-wise small, and data is coming from a set of redundant cameras, the present tracking method works very robustly. This approach to the local tracking problem delivers robust tracking of players even when the players are moving across distinct illumination conditions (such as shadow areas on the playing field). The connected components analysis cited above may be implemented by one of ordinary skill in image processing using known methods. One embodiment is based on mathematical morphology filtering and other simple pixel-wise operators.

Returning to FIG. 3, the output of block 103 is an estimate of the current position of all objects on the closed world for a given camera. Multiple of these estimates, each corresponding to a distinct camera, are then passed to block 104 for consolidation. For all objects in the scene, block 103 takes the multiple position estimates from multiple cameras produced by block 104 and the historic consensus tracking data stored from the prior frames and produces the current consensus position estimate. The current consensus estimate is subsequently appended to historic consensus tracking data. In one embodiment, the system globally tracks player positions over time using a sequential Monte Carlo technique.

Figure 9:
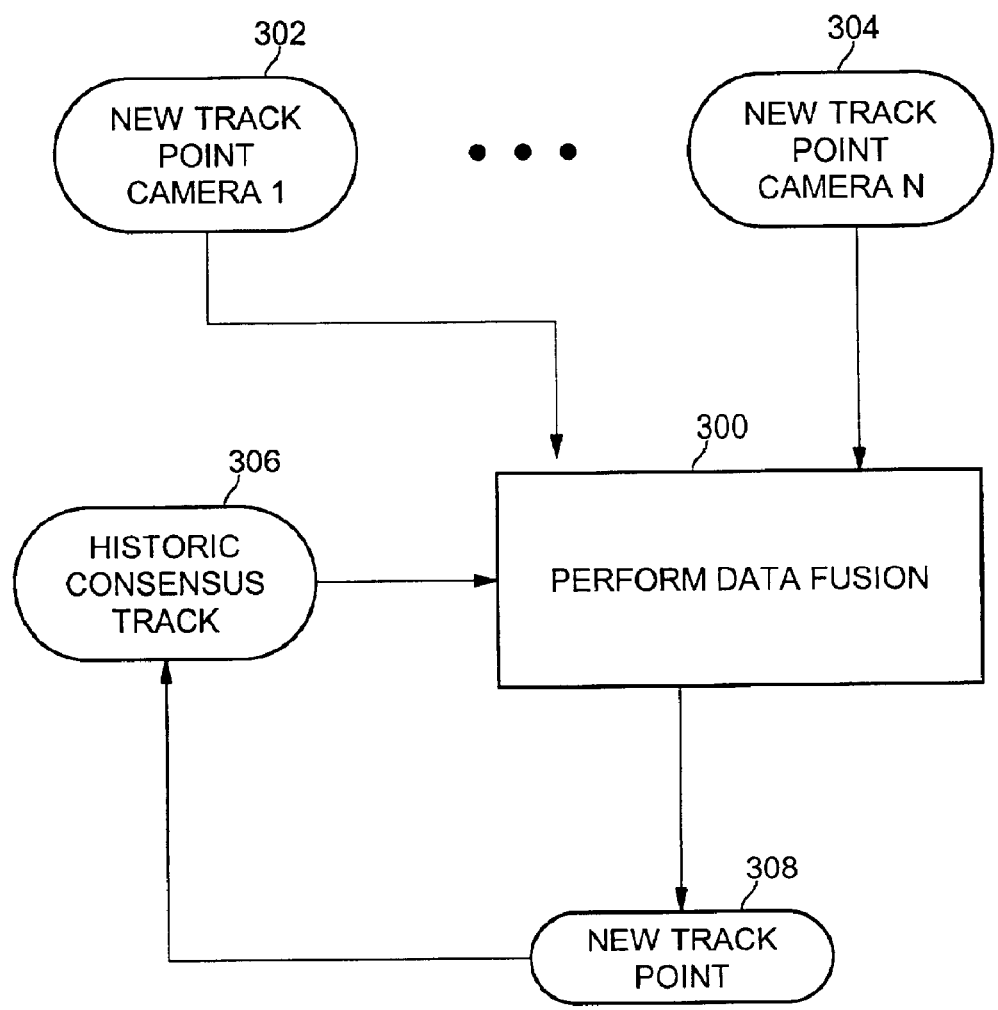
FIG. 9 is a diagram of a data fusion component to perform multiple camera data fusion according to an embodiment of the present invention.
Figure 10:
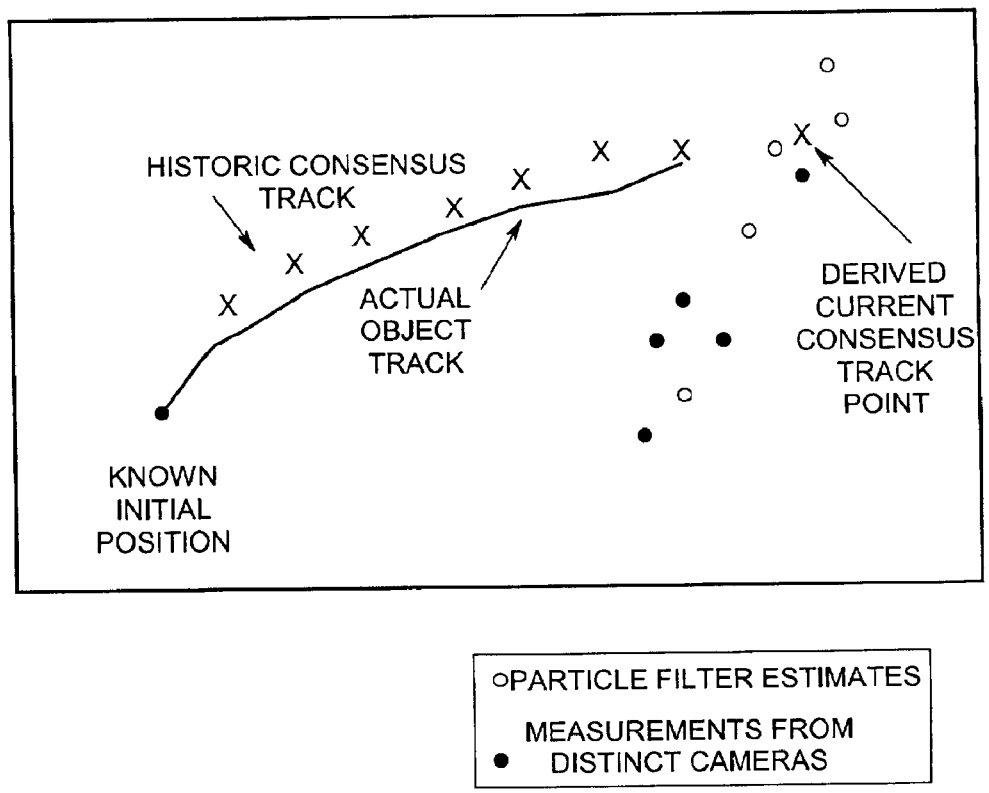
FIG. 10 is a diagram of a sample track according to an embodiment of the present invention.
Figure 11:
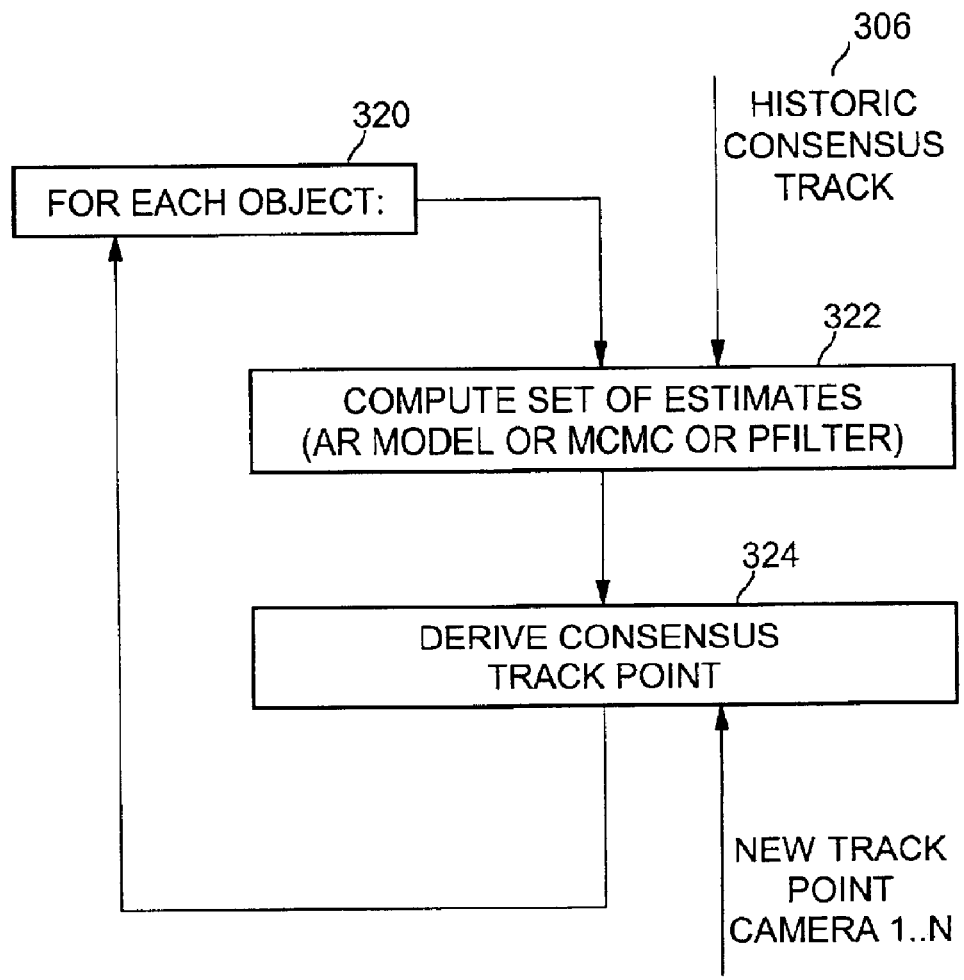
FIG. 11 is a flow diagram of estimating player positions according to an embodiment of the present invention.

The late binding consolidation procedure represented by block 104 is detailed in FIGS. 9, 10 and 11. The general idea for consolidation is to hypothesize object locations and to match those against the set of N position estimates from the distinct cameras. The procedure produces a new consensus track point as a tradeoff between the new measurements (that may be corrupted by noise) and the estimates (that may be imprecise). In one embodiment, the hypotheses may derive from the consensus historic track data and are matched against the position estimates produced by block 103.

FIG. 10 is an illustration of a single object trajectory where the actual trajectory is plotted as a continuous curve, the historic consensus track is marked with crosses, the current hypotheses are plotted as white circles and the measured position estimates from multiple cameras is shown as black circles.

The new consensus track point is derived as compromise between the hypotheses and the position estimates. In one embodiment, the estimate that closest matches the hypothesis is selected as the consensus track point. In an alternative embodiment, a Markov Chain Monte Carlo (MCMC) technique known as Particle Filtering may be used to generate a set of hypothetical object positions. The initial object position is assumed known—refer to initialization block 100. The historic consensus object position is stored from prior frames and is used by the MCMC method to draw the set of random hypotheses. The MCMC method ultimately merges the set of hypotheses and the set of position estimates produced by block 103 to produce the consensus track point for that object.

Other methods may also be used to generate hypothetical extrapolations of the current object position such as an auto-regressive (AR) model of order 2 or Kalman filtering. At block 300 of FIG. 9, the system accepts as input new track point data from camera 1 302 through new track point data from camera N 304, and the historic consensus track 306 to produce new track point 308.

FIG. 11 is a flow diagram of estimating player positions according to an embodiment of the present invention. For each object 320, a data fusion component computes a set of estimates (using an AR model, MCMC technique, or particle filtering techniques) at block 322. At block 324, the data fusion component produces a consensus position considering historical data. Markov Chain Monte Carlo techniques are known to handle occlusion and to eliminate spurious noise. Various prior art systems use well-known Kalman filtering for determining consensus player tracks. However, Kalman filtering does not work as well as MCMC methods for non-Gaussian distributions.

Since not all cameras are capable of seeing all players at a time, the location of all players in the field can only be inferred by this consolidation procedure. Depending on the layout of the cameras around the 3D scene, players may be seen by multiple cameras. To handle occlusion, a player may be seen by at least two cameras at a time. The processing system resolves conflicts by estimating the most likely player positions given the multiple tracks. Individual tracks marked invalid are not considered.

If the fit between hypothesis and estimates is deemed insufficient, the system may ask the user to re-initialize that particular player's track. The system described here tangibly reduces the amount of required user intervention.

By using embodiments of the present invention, the processing system may generate tracks for all players throughout a game or match. Game statistics may then be inferred from the tracking data. Unlike the prior art, the present invention successfully implements a cost-effective, video-only tracking solution.

Figure 12:
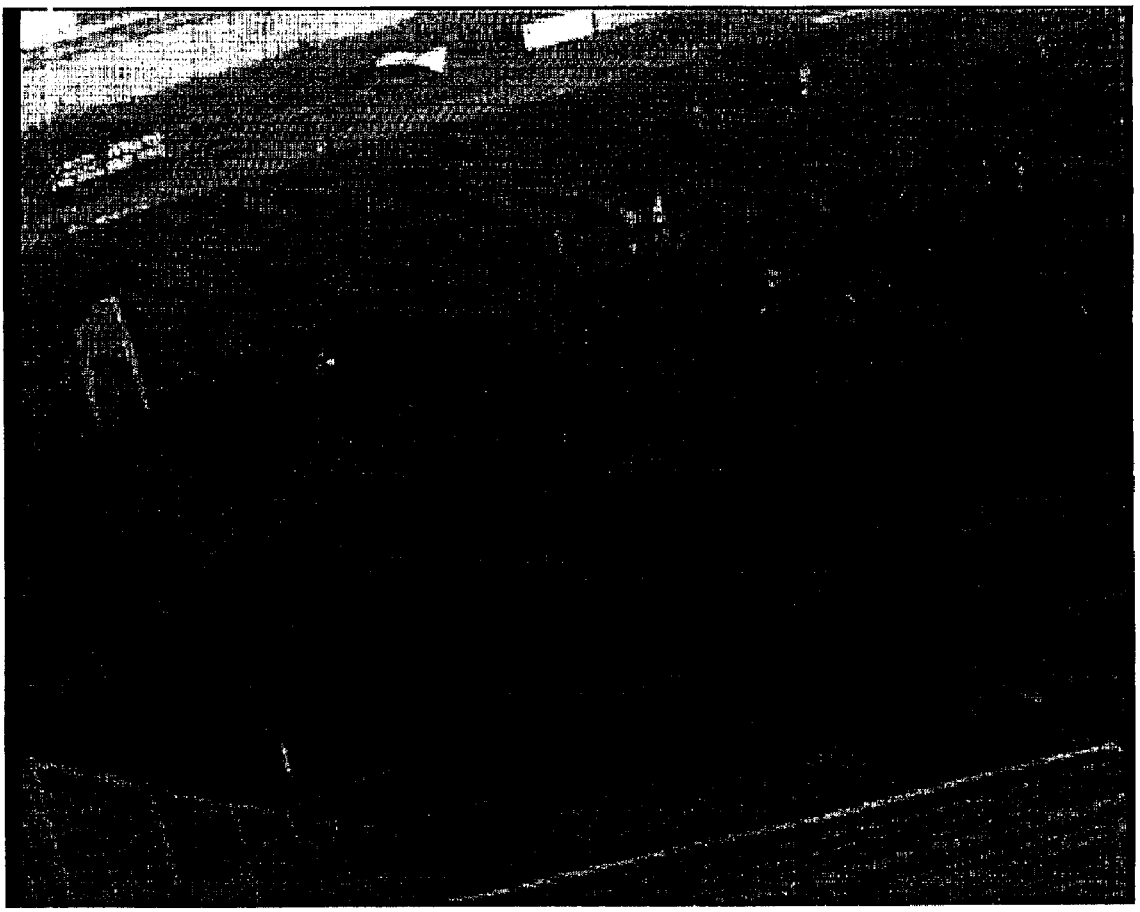
FIG. 12 is an example of an input image from a video sequence.

FIG. 12 is an example of an input image from a video sequence. In this example, the camera is positioned from a vantage point high in the stadium that provides a good coverage of the playing field. The camera is fixed, i.e., the camera's position, optics, and sensor parameters do not change over time. Notice that certain regions of the playing field are under shadow of the stadium.

Figure 13:
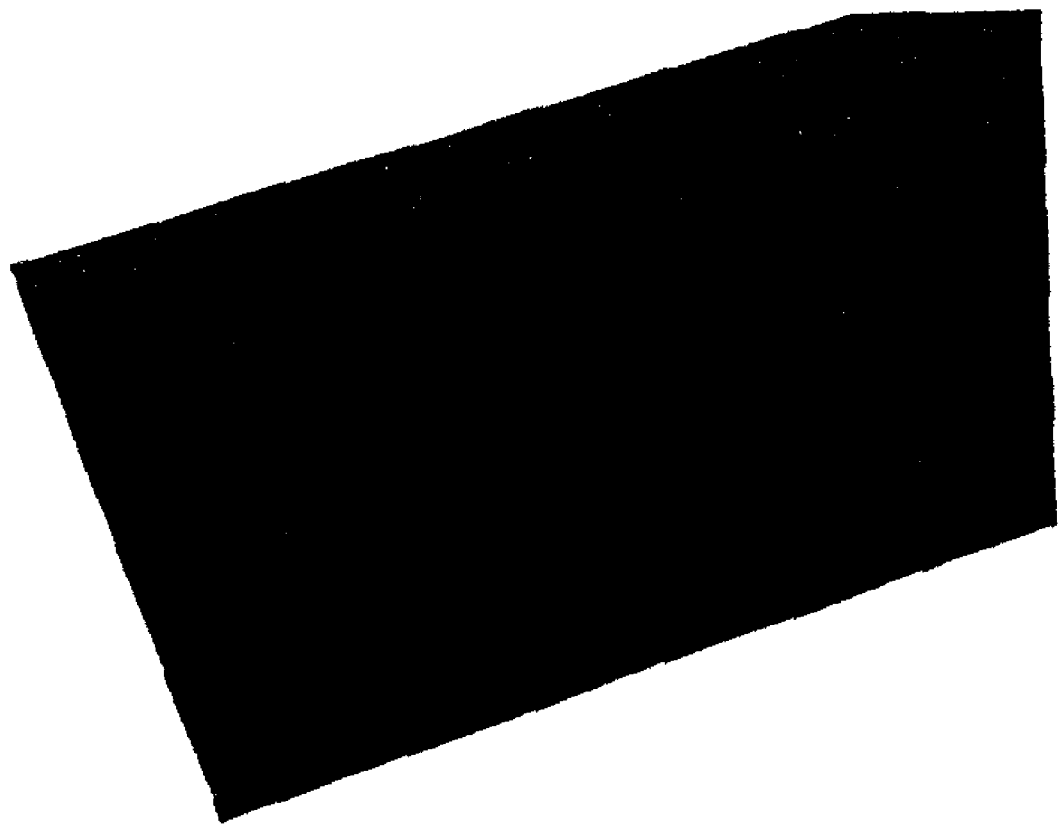
FIG. 13 is an input image clipped by the field template, the region of the image corresponding to the playing field, where white regions are considered irrelevant for further processing, according to an embodiment of the present invention.

FIG. 13 is an example of a binary segmentation field template 224 applied to a typical input image according to an embodiment of the present invention. In this example, the template was created by manually clicking on selected landmarks on the playing field (i.e., field corners, image boundaries, etc.). All pixels outside the template polygon are rejected.

Figure 14:
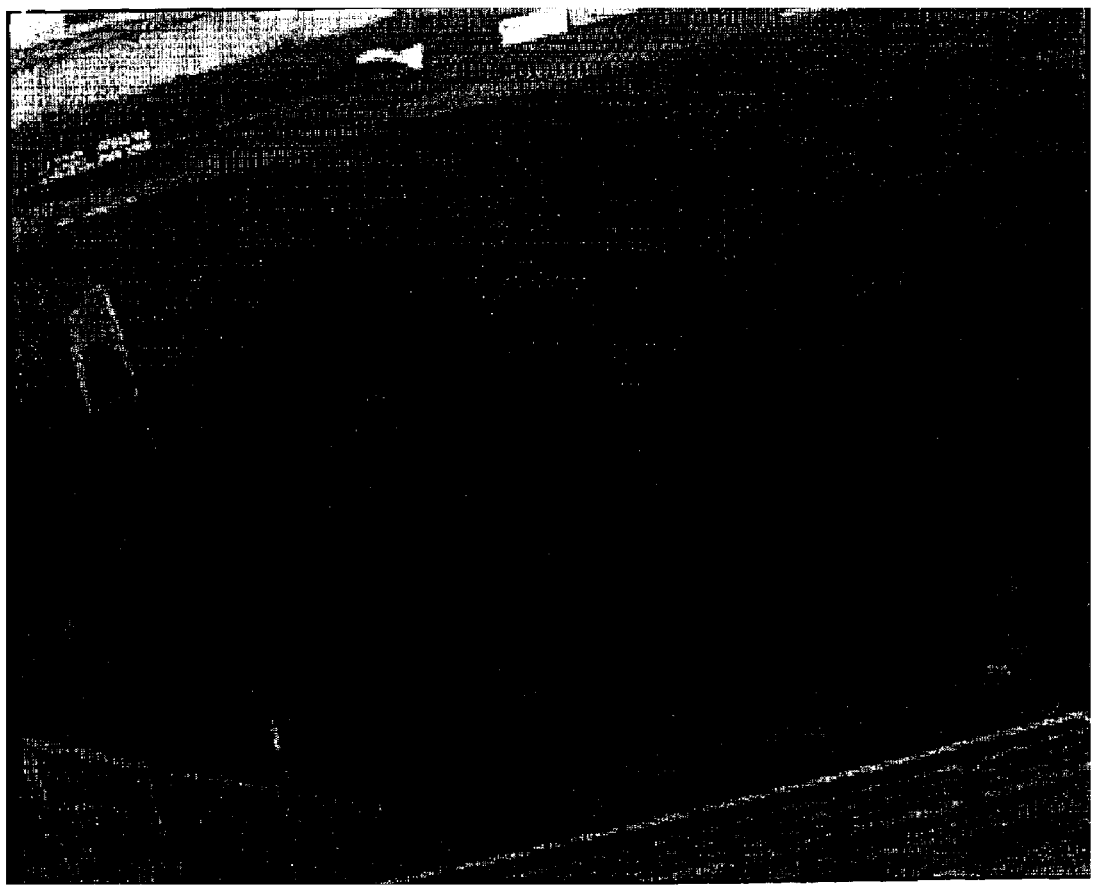
FIG. 14 is an example of a field model generated by the field model generator described in FIGS. 3 and 4.

FIG. 14 is an example of a field model 222 generated from a video sequence of a soccer match in progress according to an embodiment of the present invention. Notice that the players, ball and referees are automatically removed and replaced by the grass background. Snapshots of the field without moving objects are not required. A distinct field model is generated for each camera.

Figure 15:
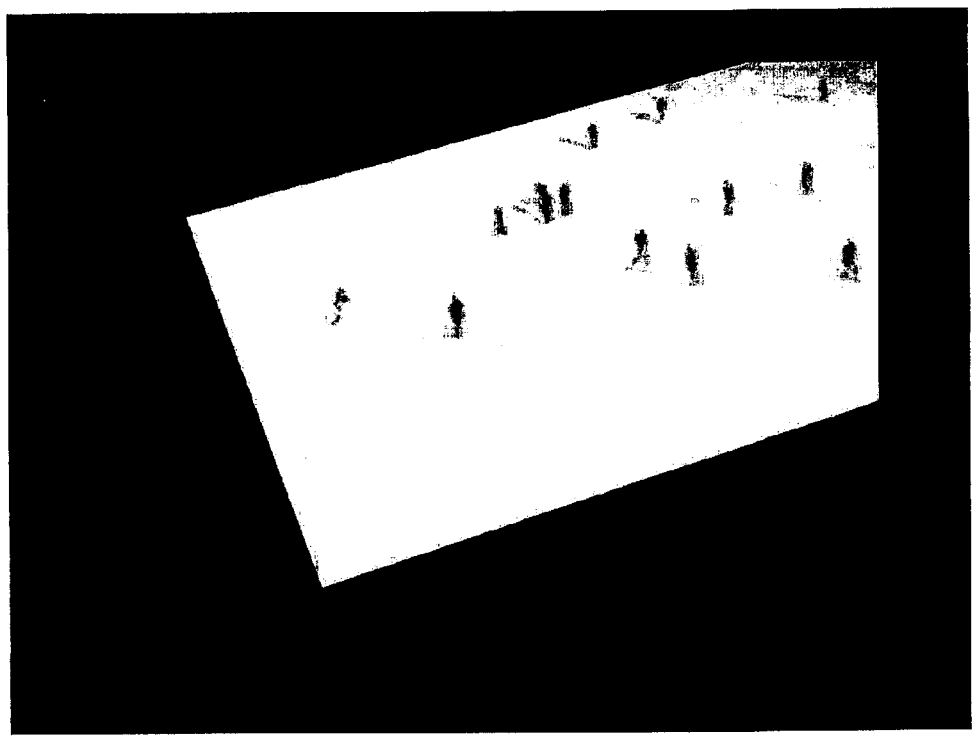
FIG. 15 is an example showing the results of the player segmentation component described in FIGS. 3 and 6.

FIG. 15 is an example showing the results of subtracting a given video frame from the current field model 222 according to an embodiment of the present invention. As direct subtraction is prone to noise, to achieve the result image presented in FIG. 15, one may also apply noise floor rejection and morphological filtering to segment the players from the rest of the scene.

Figure 16:
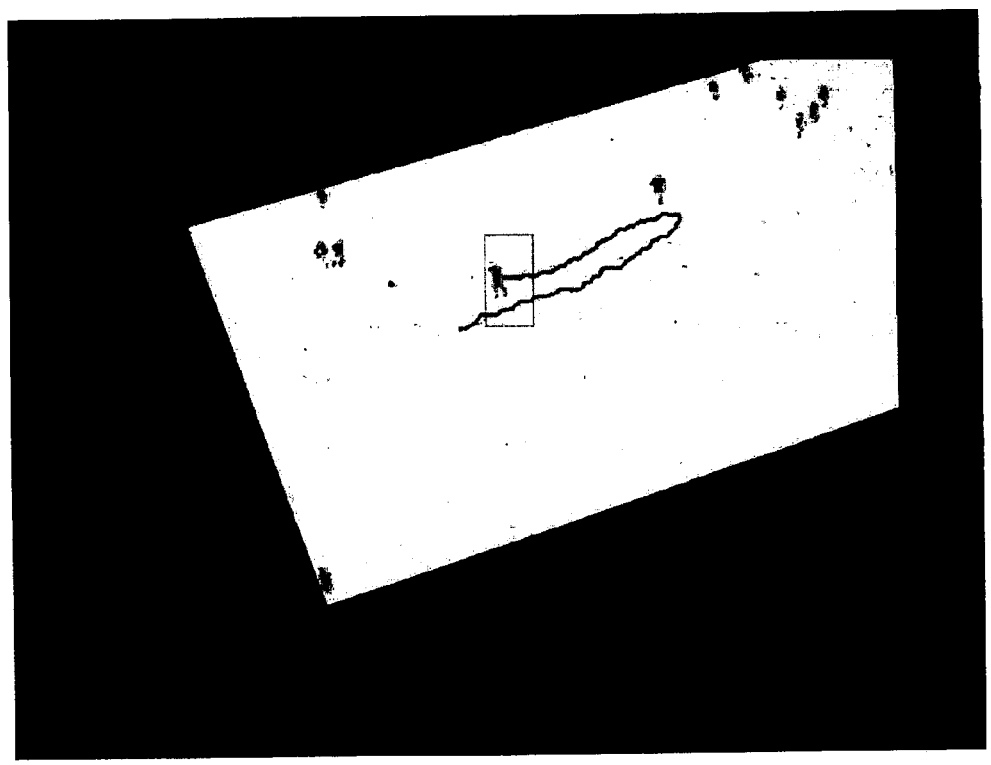
FIG. 16 is an example of tracking data generated by the tracking update component described in FIGS. 3 and 7.

FIG. 16 is an example of resulting tracking data for a single player superimposed to a final video player segmentation image according to an embodiment of the present invention. The system was capable of tracking the player's trajectory for the whole extent of the experimental data (roughly 400 video frames).

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of simultaneous tracking of multiple objects in a sequence of video frames captured by multiple cameras comprising:

extracting a foreground image from a background image in a frame;

segmenting objects from the foreground image;

tracking objects within the frame by identifying the largest connected components inside each objects region of interest;

globally tracking positions of objects over time across multiple frames;

fusing track data of objects obtained from multiple cameras to infer object positions; and resolving conflicts to estimate most likely object positions over time.

2. The method of claim 1, wherein segmenting the objects from the foreground image comprises segmenting the objects from the foreground image by examining motion of the objects in the sequence of video frames.

3. The method of claim 2, wherein examining motion of the objects comprises using a two tier hierarchical median filter.

4. The method of claim 3, wherein segmenting objects from the foreground image comprises segmenting objects from the foreground image under varying illuminations of the foreground image and the objects.

5. The method of claim 3, wherein segmenting objects comprises computing a difference between a current frame and a field model to produce a difference image, applying a field template to clip a region of interest from the difference image to produce a clipped difference image, and enhancing the clipped difference image to produce an object image.

6. The method of claim 1, wherein globally tracking positions of objects over time comprises using a sequential Monte Carlo technique.

7. The method of claim 1, wherein fusing track data of objects comprises disambiguating disparities due to occlusion of objects.

8. The method of claim 1, wherein the foreground image comprises a playing field for a sporting event and the objects comprise players participating in the sporting event.

9. The method of claim 1, further comprising initializing object tracking processing by creating a foreground image template, calibrating the cameras, and identifying visible objects on a first frame.

10. An article comprising: a storage medium having a plurality of machine accessible instructions, wherein when the instructions are executed by a processor, the instructions provide for simultaneous tracking of multiple objects in a sequence of video frames captured by multiple cameras by extracting a foreground image from a background image in a frame;

segmenting objects from the foreground image;

tracking objects within the frame by identifying the largest connected components inside each object's region of interest;

globally tracking positions of objects over time across multiple frames;

fusing track data of objects obtained from multiple cameras to infer object positions; and resolving conflicts to estimate most likely object positions over time.

11. The article of claim 10, wherein instructions for segmenting the objects from the foreground image comprise instructions for segmenting the objects from the foreground image by examining motion of the objects in the sequence of video frames.

12. The article of claim 11, wherein instructions for examining motion of the objects comprise instructions for implementing a two tier hierarchical median filter.

13. The article of claim 12, wherein instructions for segmenting objects from the foreground image comprise instructions for segmenting objects from the foreground image under varying illuminations of the foreground image and the objects.

14. The article of claim 12, wherein instructions for segmenting objects comprise instructions for computing a difference between a current frame and a field model to produce a difference image, applying a field template to clip a region of interest from the difference image to produce a clipped difference image, and enhancing the clipped difference image to produce an object image.

15. The article of claim 10, wherein instructions for globally tracking positions of objects over time comprise instructions implementing a sequential Monte Carlo technique.

16. The article of claim 10, wherein instructions for fusing track data of objects comprise instructions for disambiguating disparities due to occlusion of objects.

17. The article of claim 10, wherein the foreground image comprises a playing field for a sporting event and the objects comprise players participating in the sporting event.

18. The article of claim 10, further comprising instructions for initializing object tracking processing by creating a foreground image template, calibrating the cameras, and identifying visible objects on a first frame.

19. A system for simultaneous tracking of multiple objects in a three dimensional physical scene by analysis of a sequence of video frames comprising:

a plurality of video cameras to generate a plurality of sequences of video frames representing the scene over time; and a processing system having at least one processor to simultaneously track the multiple objects, the processing system comprising a field model generator component to extract a foreground image from a background image in a frame;

a segmentation component to segment objects from the foreground image;

a tracking component to track objects within the frame by identifying the largest connected components inside each object's region of interest and to globally track positions of objects over time across multiple frames; and a data fusion component to fuse track data of objects obtained from the plurality of video cameras to infer object positions, and to resolve conflicts to estimate most likely object positions over time.

20. The system of claim 19, wherein the segmentation component segments the objects from the foreground image by examining motion of the objects in the sequence of video frames.

21. The system of claim 20, wherein the segmentation component examines motion of the objects using a two tier hierarchical median filter.

22. The system of claim 21, wherein the segmentation component segments objects from the foreground image under varying illuminations of the foreground image and the objects.

23. The system of claim 21, wherein the segmentation component computes a difference between a current frame and a field model to produce a difference image, applies a field template to clip a region of interest from the difference image to produce a clipped difference image, and enhances the clipped difference image to produce an object image.

24. The system of claim 19, wherein the tracking component globally tracks positions of objects over time using a sequential Monte Carlo technique.

25. The system of claim 19, wherein the data fusion component disambiguates disparities due to occlusion of objects.

26. The system of claim 19, further comprising an initialization component to initialize object tracking processing by creating a foreground image template, calibrating the cameras, and identifying visible objects on a first frame.

* * * * *